United States Patent Office 3,085,584
Patented Apr. 16, 1963

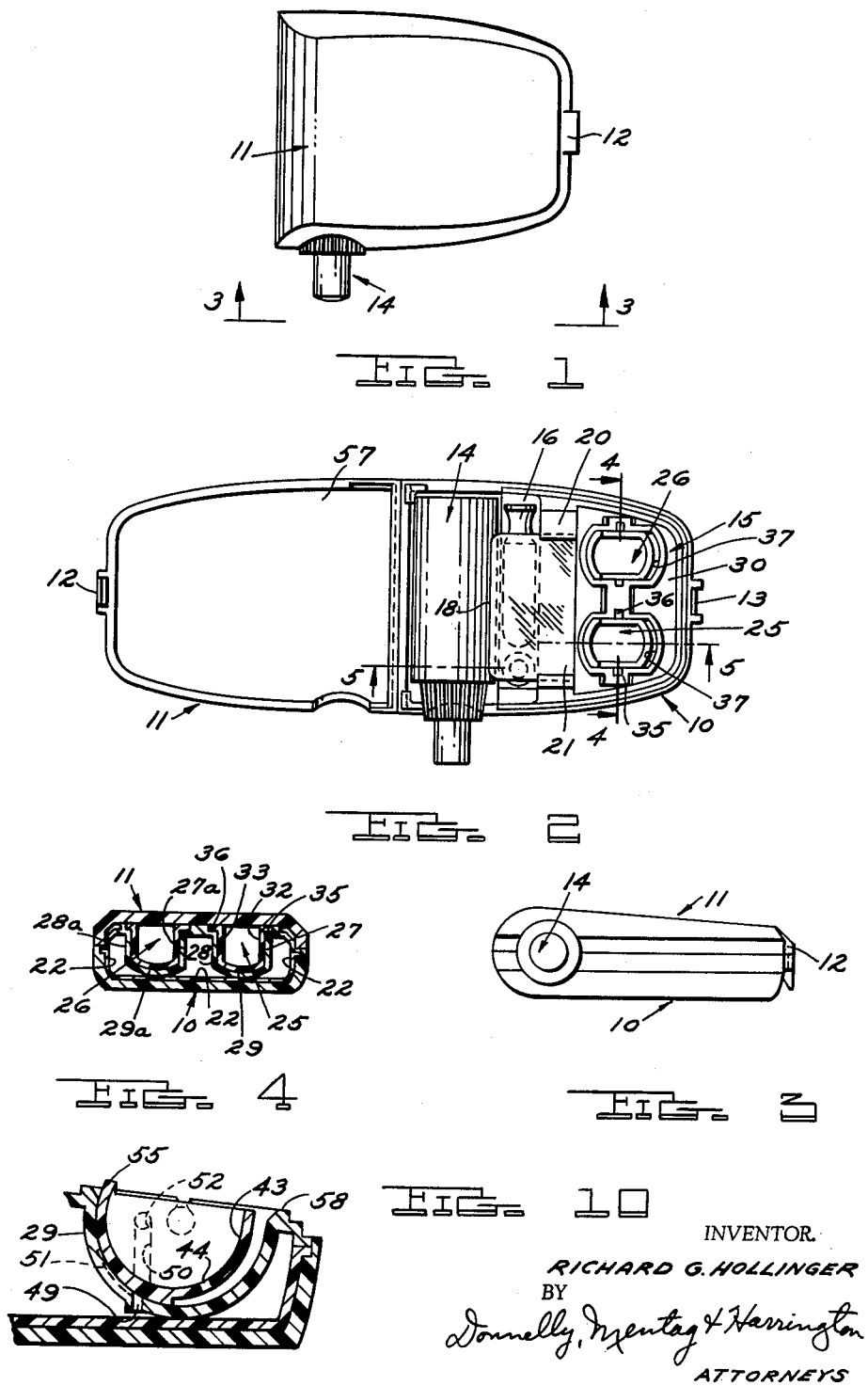

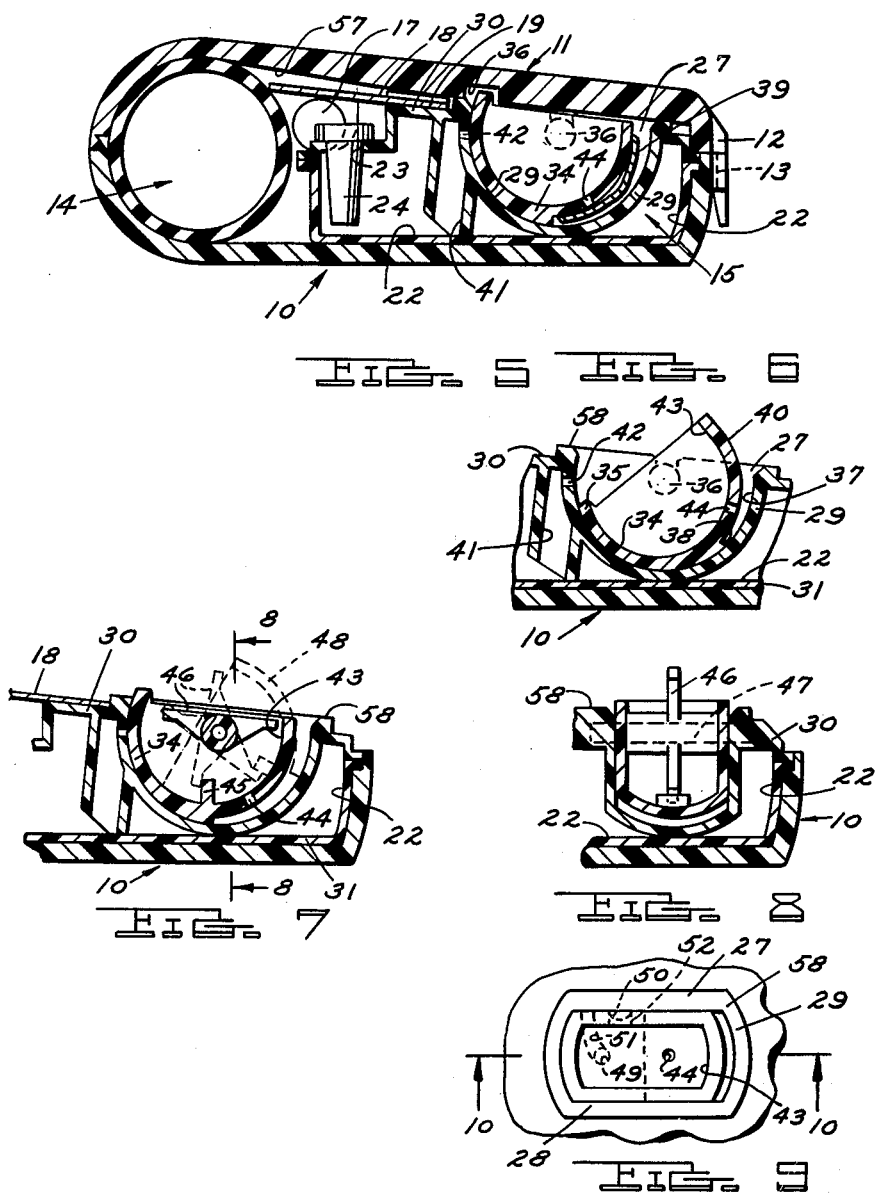

3,085,584
CONTACT LENS TRAVEL KIT
Richard G. Hollinger, 10745 Kingston,
Huntington Woods, Mich.
Filed June 6, 1962, Ser. No. 200,429
7 Claims. (Cl. 134—137)

This invention relates generally to the contact lens art, and more particularly to a novel and improved contact lens carrying case or travel kit which is adapted to hold a pair of contact lenses in a soaking chamber filled with a solution to maintain complete submersion of the lenses and which is provided with a wetting solution bottle for carrying a supply of wetting solution, and a mirror and suction cup for applying and removing the lenses from the eyes of a user.

It is a well known practice in the contact lens art to keep the contact lenses wet when they are not in use. It is important to keep the lenses in a soaking solution when they are not in use so as to prevent the eye fluid secretions on the lenses from drying and caking thereon. It has been found that some of the prior art contact lens carrying cases have been unsatisfactory because they have a tendency to flatten out the lenses and thereby damage the lenses and make them useless. Accordingly, it is an important object of the present invention to provide a contact lens carrying case which is constructed and arranged so that it will not flatten the contact lenses but will maintain the lenses in a pair of curved soaking chambers which are formed with surfaces substantially parallel to the curvature of the contact lenses, whereby optimum conditions are present for storing the lenses and the lenses will not be flattened by continued storage in the contact lens carrying case.

It is another important object of the invention to provide a contact lens carrying case which employs a small or limited amount of soaking solution in each of the soaking chambers and wherein the contaminated soaking solution in each of the soaking chambers is ejected automatically from the soaking chambers every time the contact lenses are removed therefrom, and, the soaking chambers are filled with fresh supply of soaking solution after each automatic ejection of the contaminated soaking solution.

It is another object of the present invention to provide a contact lens carrying case which includes a housing having a pleasing appearance and in which is detachably mounted the soaking chamber unit, a mirror and a suction cup for applying and removing the contact lenses, and, a bottle for carrying a supply of wetting solution.

It is a further object of the present invention to provide a contact lens carrying case which is simple and compact in construction, economical of manufacture, leak proof, shock resistant, light in weight, and small enough in size to be easily carried in a woman's handbag or in a man's pocket.

It is still another object of the present invention to provide a contact lens carrying case which is constructed and arranged so that the lenses may be easily and quickly placed on pivotally mounted holders or rocker members which are adapted to rock the contact lenses into separate arcuately shaped soaking chambers wherein the capillary actions or capillary attractions are balanced and the lenses will not be flattened by such actions or attractions.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a top plan view of a contact lens carrying case made in accordance with the principles of the invention;

FIG. 2 is a top plan view of the structure illustrated in FIG. 1 with the cover being moved to the open position;

FIG. 3 is a side elevational view of the structure illustrated in FIG. 1, taken along the line 3—3 thereof and looking in the direction of the arrows;

FIG. 4 is an elevational sectional view of the structure illustrated in FIG. 2, taken along the line 4—4 thereof and looking in the direction of the arrows;

FIG. 5 is an enlarged longitudinal sectional view of the structure illustrated in FIG 2, taken along the line 5—5 thereof, with the cover in the closed position, and looking in the direction of the arrows marked "5";

FIG. 6 is a fragmentary view of the structure illustrated in the right side of FIG. 5, and showing the pivotally mounted lens holder in a partially turned position for discharging the lens from the soaking chamber;

FIG. 7 is a fragmentary longitudinal sectional view through a modified soaking chamber, similar to the structure shown in FIG. 5, and showing the soaking chamber rocker member provided with a means for rocking the same;

FIG. 8 is a fragmentary elevational sectional view of the structure illustrated in FIG. 7, taken along the line 8—8 thereof and looking in the direction of the arrows;

FIG. 9 is a fragmentary plan view of a modified soaking chamber employed in the invention; and, FIG. 10 is a fragmentary elevational sectional view of the structure illustrated in FIG. 9, taken along the line 10—10 thereof and looking in the direction of the arrows.

Referring now to the drawings and in particular to FIGS. 1, 2 and 3, the numeral 10 generally indicates a housing which is enclosed on the upper side thereof by a hingedly mounted cover generally indicated by the numeral 11. The cover 11 is provided with a snap member 12 which is adapted to releasably engage the projection 13 on the end of the housing 10 for holding the cover 11 in a closed position. It will be understood that any suitable means may be provided for securing the cover 11 on the housing 10. The housing 10 and the cover 11 may be made from any suitable material as, for example, a plastic material such as acrylic plastic. If a plastic material is used it may be colored as desired for ornamental purposes. As shown in FIGS. 1, 2 and 3, a bottle of wetting solution generally indicated by the numeral 14 is carried in the housing 10 and is disposed in a transverse position at one end thereof, and with the spout end of the bottle being extended outwardly through a hole which is formed partially in the housing 10 and partially in the cover 11.

As shown in FIGS. 2 and 5, a soaking chamber unit generally indicated by the numeral 15 is mounted in the housing 10, in the end of the housing opposite to the end in which the bottle 14 is mounted. The soaking chamber unit 15 may be made from any suitable material as, for example, a plastic material as polyethylene plastic. The soaking chamber unit 15 is snapped in place in the housing 10 and may be removed for servicing purposes.

As shown in FIGS. 2 and 5, the inner end of the soaking chamber unit 15 is provided with a step 16 on which is carried a suction cup 17 for applying the contact lenses to the eyes of a user. A mirror 18 is adapted to be carried by the soaking unit 15 and is disposed at an angle approximately 5° upwardly from the horizontal. As shown in FIG. 2, the mirror 18 lies over the suction cup 17 and is held in place on the top surface 19 of the soaking unit 15 by means of a pair of lugs 20 and 21 which are integrally formed on the top of the soaking chamber unit 15. It will be understood that the mirror 18 may be detached from the soaking chamber unit 15 by grasping the same and moving it to the left, as viewed in FIG. 2, to remove it from underneath the lugs 20 and 21.

As shown in FIG. 5, the soaking chamber unit 15 is provided with a soaking solution storage chamber 22 which is provided with a fill hole 23 that is closed by means of a tapered plastic plug 24 which is made from the same material as the soaking unit 15. As shown in FIGS. 2 and 4, the soaking unit 15 is provided with a pair of soaking chambers generally indicated by the numerals 25 and 26.

Each of the soaking chambers 25 and 26 is similarly constructed and the soaking chamber 25 will be described in detail and the soaking chamber 26 will be marked with similar reference numerals followed by the small letter "a." The soaking chamber 25 includes the stationary body portion which extends downwardly into the soaking solution storage chamber 22 and which includes the vertical, hemispherically curved, combined bottom and end wall 29. The stationary body portion is open at the upper end thereof, and the walls 27, 28 and 29 are integral with the top wall 30 of the soaking chamber unit 15. The curved wall 29 is formed concave downwardly and abuts the lower wall 31 of the soaking chamber unit 15.

A rocker member is rockably mounted in the stationary body portion and it is formed similar thereto. The rocker member includes the vertical spaced apart side walls 32 and 33, and the hemispherically curved combined bottom and end wall 34 which is curved complementary to the wall 29. The rocker member is provided with the integral rocker shafts 35 and 36 which extend sidewardly outwardly and are rockably supported in suitable recesses in the soaking chamber unit upper wall 30. As shown in FIGS. 5 and 6, the rocker member is provided with an upward extension 55 which may be engaged by the finger of the user to swing the rocker member counter-clockwise, as viewed in FIGS. 5 and 6, for rotating the rocker member in the stationary body portion of the soaking chamber. When the rocker member is in the rest or storage position, the projection 55 is adapted to be seated in the recess 56 which is formed on the inner side of the cover 11, as shown in FIG. 5. It will be seen in FIGS. 5 and 6 that the inner half of the curved rocker wall 34 is complementary to the stationary body portion wall 29 and is in sliding engagement therewith. The outer portion of the rocker member curved wall 34 is cut away on the outer surface thereof to provide the space 37 between the body portion wall 29 and the rocker member outer portion of the wall 34. The recess 37 terminates in the shoulder 38 as shown in FIG. 6. As shown in FIG. 5, a contact lens, indicated by the numeral 39, is adapted to be seated in the recess 37 which is adapted to be filled with soaking solution, as described in detail hereinafter. The outer, hemispherically shaped surface 40 of the rocker member outer portion is shaped or curved so as to be disposed substantially parallel to the inner surface of the contact lens 39, when the lens 39 is disposed in the storage recess 37, so as to balance the capillary action of the soaking fluid in the recess 37 on the contact lens 39. It has been found in some prior art contact lens soaking cases that the capillary action or attraction of the soaking solution is one cause of the contact lens being flattened. Accordingly, if the curvature of the rocker member wall outer surface 40 is maintained substantially parallel to the curvature of the contact lens 39, the soaking solution capillary attraction will be balanced and the contact lens will not be warped or deformed.

As shown in FIGS. 5 and 6, when the rocker member is moved to the discharge position for removing the lens, the contaminated soaking solution in the recess 37 will be expelled or ejected. A fresh supply of soaking solution is forced from the chamber 22 and through the passage 41 into the opening 42, and thence into the cavity 43 inside of the rocker member by the action of the user squeezing the soaking chamber unit 15 which is flexible. When the rocker member has been returned to the storage position shown in FIG. 5, the soaking solution will pass from the cavity 43 through the opening 44 in the rocker wall 34 and into the recess 37 by capillary action. The recess 37 is then again ready for the reception of a contact lens for storage purposes. The recess 37 holds a small amount of soaking solution, as for example, a couple of drops thereof. It will be understood that the other soaking chamber 26 is constructed in the same manner as described for chamber 25, and it operates in a similar manner. When the rocker member is in the storage position as shown in FIG. 5, the hole 42 is completely closed to prevent contaminated soaking solution from flowing back into the fresh soaking solution in the soaking chamber 22. It will be understood that the lenses in the recesses 37 will pass any eye disease germs into the soaking solution contained therein to contaminate the same. It will be understood that when the user squeezes the soaking chamber unit 15, the rocker member is in the discharge position similar to FIG. 6 to expose the hole 42 to the atmosphere to permit air to be drawn into the chamber 22 by suction when the squeezing pressure is released. The soaking recess is not directly connected in any way to the storage chamber 22 because if it were, the aforementioned suction would suck back contaminated soaking solution and intermix it with the stored clean soaking solution.

FIGS. 7 and 8 show the same soaking chamber structure as illustrated in FIGS. 1 through 6, but these figures show a slight modification wherein the rocker member wall 34 is provided with a projection 45 which extends inwardly into the cavity 43. For purposes of rotating the rocker member, a pusher arm 46 is rockably supported on the shaft 47 which is formed integral with the shafts 35 and 36. The lower end of the pusher arm 46 is adapted to engage the projection 45 for rotating the rocker member to the lens discharge position as shown by the dotted line position 48 in FIG. 7.

FIGS. 9 and 10 show a slight modification of the structure of FIGS. 1 through 6 in that the passageways for conducting the soaking fluid from the storage chamber 22 are changed. In the modification of FIGS. 9 and 10, the body portion wall 29 is provided with an opening therethrough which communicates with the chamber 22 and which is indicated by the numeral 49. In this embodiment the fluid passes into the cavity 43 in the rocker member by means of the passage 50 which is formed in the outer side of the rocker member wall 32 and which terminates at its upper end in the opening 52. The lower end of the passage 50 connects to the communicating passage 51 which is formed in the inner surface of the body portion wall 29. The passage 51 communicates with the opening 49 in the body portion wall 29. The soaking solution is forced in the cavity 43 by squeezing the soaking chamber unit 15 when the rocker member has been swung clockwise, as viewed in FIG. 10, to align passage 50 with passage 51. The modification of FIGS. 9 and 10 operates in the same manner as the embodiment of FIGS. 1 through 6 with the exception of the changed passageways for conducting the soaking solution from the reservoir 22 into the cavity 43.

The wetting solution in the bottle 14 is used in the conventional manner by applying a couple of drops on the lenses before rinsing them and applying them to the eyes of the user.

It will be seen that the cover inner surface 57 sealingly engages the surfaces 58 on the upper end of each of the body portions of the soaking chambers.

While it will be apparent that the preferred embodiments of the invention herein disclosed are well calcuated to fulfill the objects above stated, it will be appreciated that the invention is susceptible to modification, variation and change without departing from the proper scope or fair meaning of the subjoined claims.

What I claim is:

1. A contact lens travel kit, comprising: a housing; a contact lens soaking chamber unit mounted in said housing for storing a pair of contact lenses in a lens soaking solution; a lens soaking solution storage chamber included in said soaking chamber unit; a pair of contact lens soaking chambers included in said soaking chamber unit; passageways communicating said lens soaking solution storage chamber with each of said soaking chambers for conveying lens soaking solution to said soaking chambers; a cover on said housing for enclosing said soaking chamber unit; each of said soaking chambers comprising a stationary body portion having a cavity formed therein; a rocker member having a cavity formed therein and a first outer surface portion complementary to the surface of the cavity in said body portion and in sliding engagement therewith, and a second outer surface portion complementary to but spaced from the surface of the cavity in said body portion so as to form a contact lens soaking recess for storing a contact lens therein; said rocker member being rockable between a lens storage position and a lens discharge position; and, said rocker member blocking said passageways when it is in the storage position to prevent back flow of soaking solution from said lens soaking recess to said soaking solution storage chamber.

2. A contact lens travel kit as defined in claim 1, wherein: said passageways communicating said lens soaking solution storage chamber with each of said soaking chambers comprises, a first portion formed in the stationary body portion of each soaking chamber and a second portion formed in said rocker member, and said rocker member having an opening therethrough communicating the cavity formed therein with the contact lens recess.

3. A contact lens travel kit as defined in claim 1, wherein: said passageways communicating said lens soaking solution storage chamber with each of said soaking chambers comprises, connecting passageways formed in the stationary body portion of each of the soaking chambers, and, each of the rocker members being provided with an opening to communicate the cavity therein with the contact lens recess.

4. A contact lens travel kit as defined in claim 1, wherein: each of said rocker members is provided with an integral lug and a pivotally mounted arm for engaging the lug for turning the rocker member from the storage position to the contact lens discharge position.

5. A contact lens travel kit as defined in claim 1, wherein: each of said rocker members is provided with an extension thereof on one end thereof which extends above the soaking chamber stationary body portion to permit the user of the same to rock the rocker member from the storage position to the contact lens discharge position.

6. A contact lens travel kit as defined in claim 1, wherein: the side walls of the soaking chamber stationary bodies and the side walls of the rocker members are vertical; and the end walls and bottom walls are hemispherically shaped.

7. A contact lens travel kit, comprising: a housing, a contact lens soaking chamber unit mounted in said housing for storing a pair of contact lenses in a lens soaking solution; said soaking chamber unit including a pair of contact lens soaking chambers; a soaking solution storage chamber in said soaking chamber unit; each of said soaking chambers including a recess for the reception of a contact lens and a supply of soaking solution; and, said recess being formed with spaced apart walls which are curved so as to be substantially parallel to the curved surfaces of the contact lens.

References Cited in the file of this patent

UNITED STATES PATENTS

| | | |
|---|---|---|
| 2,877,779 | Bromberg | Mar. 17, 1959 |
| 2,944,661 | Goldstein | July 12, 1960 |
| 3,035,589 | King | May 22, 1962 |

FOREIGN PATENTS

| | | |
|---|---|---|
| 607,642 | Canada | Oct. 25, 1960 |